(12) United States Patent
Howard et al.

(10) Patent No.: US 7,753,280 B1
(45) Date of Patent: Jul. 13, 2010

(54) PERSONAL BANK CARD STORAGE DEVICE AND METHOD OF USE

(76) Inventors: Marcus Howard, 4763 Tacony St., Philadelphia, PA (US) 19137; Donna Harvey, 4763 Tacony St., Philadelphia, PA (US) 19137

( * ) Notice: Subject to any disclaimer, the term of this patent is extended or adjusted under 35 U.S.C. 154(b) by 0 days.

(21) Appl. No.: 12/231,456

(22) Filed: Sep. 3, 2008

(51) Int. Cl.
*G06K 7/00* (2006.01)
*G06K 5/00* (2006.01)

(52) U.S. Cl. ............... 235/486; 235/380; 235/382

(58) Field of Classification Search .......... 235/475, 235/483, 486, 375, 380, 382
See application file for complete search history.

(56) References Cited

U.S. PATENT DOCUMENTS

| | | | | |
|---|---|---|---|---|
| 4,523,087 A | * | 6/1985 | Benton | 235/379 |
| 4,719,338 A | * | 1/1988 | Avery et al. | 235/380 |
| 5,015,830 A | * | 5/1991 | Masuzawa et al. | 235/441 |
| 5,272,319 A | * | 12/1993 | Rey | 235/379 |
| 5,987,325 A | * | 11/1999 | Tayloe | 455/435.2 |
| 6,128,511 A | * | 10/2000 | Irie | 455/558 |
| 6,557,753 B1 | * | 5/2003 | Beaujard et al. | 235/375 |
| 6,612,488 B2 | * | 9/2003 | Suzuki | 235/380 |
| 6,990,026 B2 | * | 1/2006 | Yagi | 365/195 |
| 7,134,600 B2 | * | 11/2006 | Tomoeda et al. | 235/451 |
| 7,137,548 B2 | * | 11/2006 | Schilling | 235/375 |
| 7,182,251 B2 | * | 2/2007 | Tomoeda et al. | 235/375 |
| 7,203,784 B2 | * | 4/2007 | Harada et al. | 710/301 |
| 7,392,946 B2 | * | 7/2008 | Hellstrom et al. | 235/441 |
| 2002/0002507 A1 | * | 1/2002 | Hatakeyama | 705/26 |
| 2004/0087339 A1 | * | 5/2004 | Goldthwaite et al. | 455/558 |
| 2005/0045731 A1 | * | 3/2005 | Kojima et al. | 235/492 |
| 2006/0196933 A1 | * | 9/2006 | Tomoeda et al. | 235/486 |
| 2007/0084913 A1 | * | 4/2007 | Weston | 235/380 |

\* cited by examiner

*Primary Examiner*—Thien Minh Le
*Assistant Examiner*—April A Taylor
(74) *Attorney, Agent, or Firm*—Charles L. Riddle, Esq.; Riddle Patent Law

(57) ABSTRACT

A personal bank card storage device for carrying one or more bank cards, having a housing, a magazine contained within the housing, tracks contained within the magazine, and at least one motor contained within the housing for moving the cards, the device has a key pad, a controller connected to the keypad for reading input from the key pad and operating at least; the invention further includes a method of storing and accessing one or more bank cards for use and includes the steps of providing a personal bank card storage device, inserting one or more bank cards in the container contained within the storage device, programming a personal pass code on a keypad, recalling the personal pass code, entering the personal pass code on the key pad to enable access to the one or more cards.

5 Claims, 2 Drawing Sheets

PERSONAL BANK CARD STORAGE DEVICE AND METHOD OF USE

BACKGROUND OF INVENTION

1. Field of the Invention

The present invention relates to personal accessories for carrying credit cards or bank cards, and more particularly concerns an electronic device which stores and controls access to one or more personal bank cards, and provides a user with transaction information concerning one or more bank cards.

2. Brief Description of Prior Art

Items such as wallets, purses and pocketbooks are commonly used to carry one's bank cards or credit cards (hereinafter used interchangeably). However, the current items do not provide for locked storage of the cards, and the bank cards can easily be removed and used without the owner's permission. There is a need for securely storing one's bank cards in a device which is portable and can be carried by the user and allows the user to access the bank cards when needed, otherwise having the bank cards securely stored where access to said bank cards is limited. Accordingly, it is desirable to store one or more personal bank cards so that access to said bank cards is limited and controlled by a user.

Credit card information is often stolen and used by unauthorized people. Usually, by the time the owner becomes aware of it, the damage has been done and multiple transactions have taken place. Accordingly it is desirable to be notified in a reasonable amount of time when a transaction is made on a bank card and have a portable device that can provide this information.

SUMMARY OF THE INVENTION

It is an object of this invention to provide a means for carrying one or more bank cards in a manner that limits access to the bank cards and selectively allows access to said bank cards when desired by the owner of said bank cards. It is another object of the invention for providing, along with a means for storing/carrying one or more bank cards, a means to display information relating to any accounts that are associated with the one or more bank cards that are stored in the device. It is another object of the invention, to provide a device with communication functionality for allowing the device to communicate using a telecommunication network to send and receive information such as transaction information. It is another object of the invention to provide location means with the bank card device for allowing the device to ascertain its geographic location. Another object of the invention is to protect the cards from damaged strips, wear and tear, bending and breakage.

These and other objects are accomplished by my invention which is described below.

DETAILED DESCRIPTION OF THE INVENTION

Figure 1:
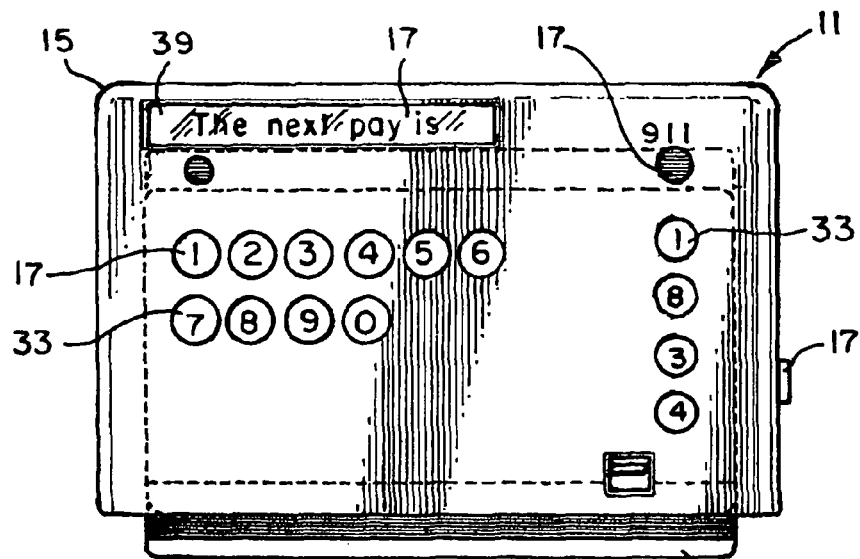
FIG. 1 is a view of a personal bank card storage device showing the face.
Figure 1A:
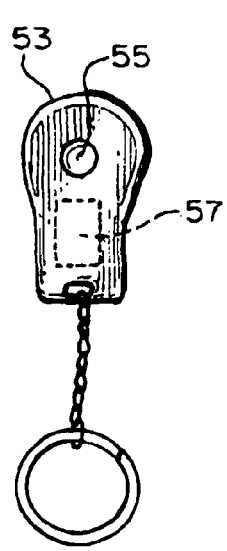
Figure 1B:
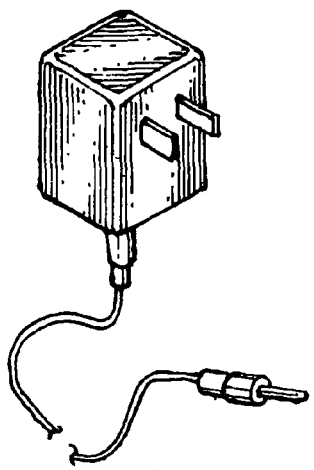
Figure 1C:
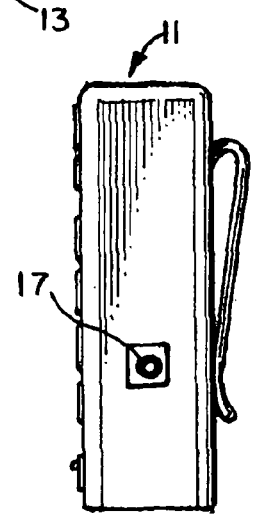
Figure 2:
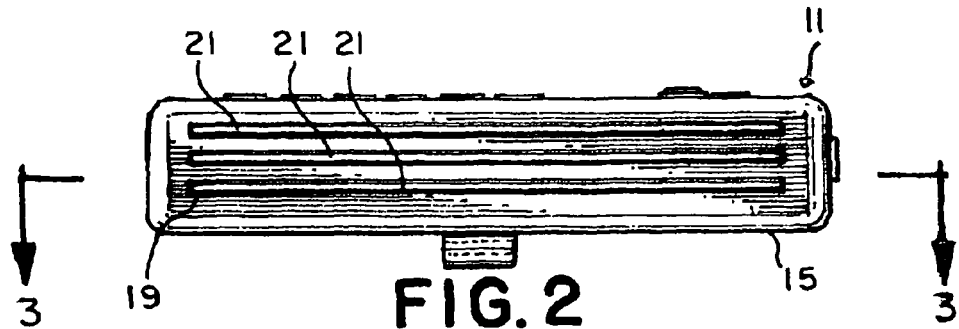
FIG. 2 is a side view of the personal bank card storage device showing one or more openings in the housing for inserting a personal bank card.
Figure 3:
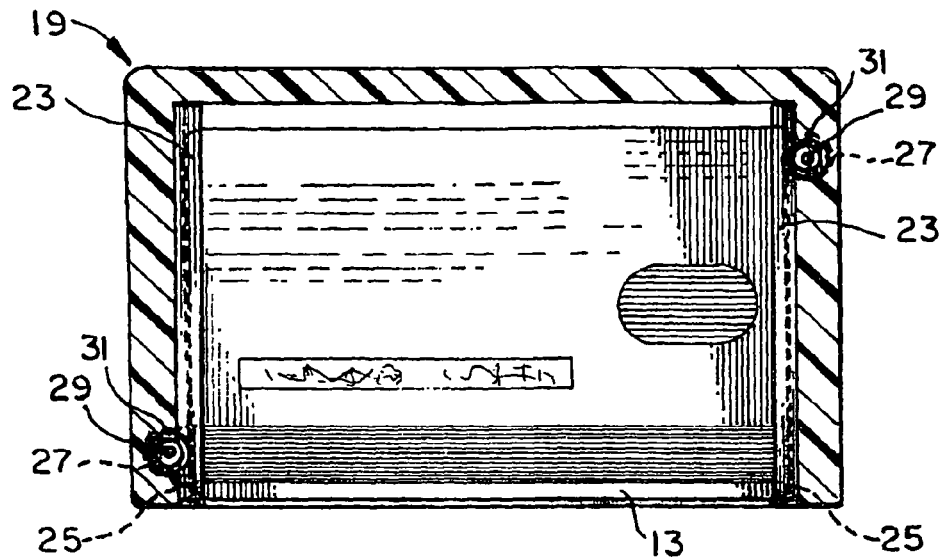
FIG. 3 is a schematic drawing of a preferred embodiment for the magazine portion of the device.

Turning to FIG. 1-FIG. 3 there is shown a personal bank card storage device 11 for carrying one or more bank cards 13. The device 11 comprising a housing 15 for containing the one more bank cards 13 and for containing one or more components 17. The device further includes a magazine 19 contained within the housing 11 and defined by at least one opening 21 in said housing 11 and having at least one set of opposing tracks 23 for receiving an edge 25 of a bank card 13. The storage device 11 further includes at least one motor 27 contained within the housing 15. The motor 27 having a shaft 29 and a wheel 31 attached to the shaft 29. The wheel 31 for contacting the bank card 13 while the edge of the bank card 13 is inserted into the at least one opening 21 aligned with the at least one set of opposing tracks 23. The wheel 31 being attached to the motor 27 via the shaft 29 and is so disposed to slide the bank card 13 along the set of opposing guide rails or tracks 23 when the motor 27 is activated. The guide rails 23, or tracks 23 can be C-shaped channels, for example to receive the edge 25 of the bank card 13. The storage device 11 further includes a keypad 33 contained with and extending through the housing 15 for allowing a user to input information such as a pass code into the device 11. The device 11 further includes a controller 35 operatively connected to the keypad 33 and the motor which is 27 for reading input from the keypad 33 and operating the at least one motor 27. Further included to operate the device 11 is a powering means 37 operatively connected to the controller 35, the keypad 33 and the motor 27 to enable the same to operate as desired.

In use, one or more bank cards 13 are stored by inserting the card 13 into the opening 21 of the device 11. The at least one set of opposing tracks 23 receives the edge 25 of said bank card 13 and the card 13 is engaged by the wheel 31 attached to the at least one motor 27 by the shaft 29, and the motor 27 turns the wheel 31 to take the card 13 into the magazine 19. When a card 13 is needed, the user inputs a code on the keypad 33 to actuate the motor 27 to slide the card 13 (or a portion of the card such as the magnetic strip) outside of the opening 21 of the housing. The code can be a pin number entered in the keypad 33 and pushing a button for a designated card 13 to slide out. The input from the keypad 33 is read by the controller 35 and the controller 35 decides whether to actuate the motor 27.

The personal bank card storage device 11 may further comprise a display 39 operatively connected with the controller 35 contained within and extending through the housing 15 for providing the user with a visual display of information. For example, the device can display whether the pass code enter is correct or incorrect or a menu of choices for operating the device, or transaction information.

The device may display a menu of selections. The device may further comprise telecommunication components 41 operatively coupled with the controller 35 for connecting and communicating with an outside server 43 via a telecommunication network 45. The telecommunication components 41 enable the sending/receiving of information, such as transaction information relating to any bank cards associated with the device.

Figure 4:
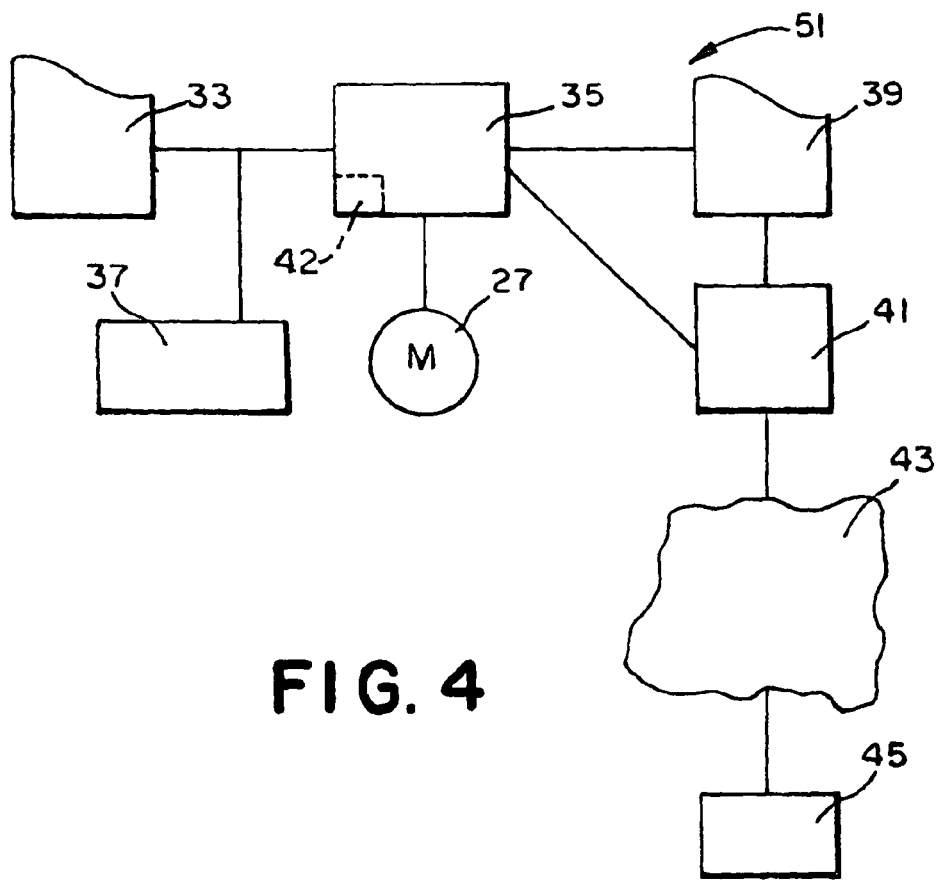
FIG. 4 is a schematic diagram showing select control components of the device.

In operation, the telecommunication components 41 communicate with an outside server (for example 43) via the telecommunication network 45 to obtain information relating to any accounts that are associated with the one or more bank cards 13, and the information is then stored in a memory location 47 (shown in FIG. 4 as part of the controller 35, but can be separate from the controller) and displayed on the display 39 in accordance with an input command to display this information from the keypad 33. For example the server 43 may initiate a communications link with the device 11 using the telecommunication components 41 and send the device 11 current information regarding transactions concerning any bank cards 13 associated with said device 11. Said information is then shown on the display accompanied by a sound. For example, this may occur within minutes of a transaction showing up on the server 43.

In operation, a user may enter a code on the keypad, the input is read by the controller 35. The controller 35 either displays the information relating to the code on the display and/or connects with the telecommunication components 41 to enable communication with the outside server 43 via the telecommunication network 45 to obtain an updated set of information relating to any accounts associated to the one or more bank cards 13.

The bank card storage device may further comprise location components 49 (such as gps) operatively coupled with the controller 35 for determining the geographic location of the device 11 wherein the device 11 acquires its location using the location components 49 and/or telecommunication components 41, and if directed to do so by the user through input or instructions (in the form of entering code) on the keypad 33, the controller 35 and/or the location components 49 communicates said geographic location to another device utilizing the telecommunication components 41. This can be accompanied by a message (along with the location) to act as a panic or emergency call button to inform of emergency, or the like.

My invention also includes a personal bank card security and account tracking system 51 for securely carrying one or more bank cards 13 and for providing information regarding any accounts that are associated with the one or more bank cards 13. The personal bank card security and account tracking system 51 minimally comprises an account information server 45 and the bank card storage device 11 as discussed herein, wherein communication is initiated between the account information server 45 and the bank card storage device 11 through the telecommunication components 41 operatively coupled with the controller 35. It is to be understood that the telecommunication components 41 can be the components used in a cell phone for communicating with a traditional cell phone network, or the telecommunication components 41 may include as a substitute or an addition to the existing telecommunication components 41 wi fi components, local network components or any other forms of wireless communication to enable the device 11 to communicate with a network. In operation, once communication is established as described above, the account information server 45 sends the information regarding one or more accounts associated with the one or more bank cards 13, and said information is stored in a memory location 47 and displayed on the display 39 in accordance with an input command to display from the keypad 33. The device may provide a tone or vibration or other stimuli to alert the user of a transaction relating to one or more bank cards 13 associated with the device 11, for example.

The personal bank card security and account tracking system 51 may further include a keychain 53. The keychain having at least one button 55 operatively connected to keychain telecommunication components 57 for connecting to the server/account information server 45 using a communications network 43 and relaying information to the account information server 45 or another server. This enables a user to notify the account information server 45, or another server that the bank card storage device 11 is loss/stolen by pushing the button 55 on the keychain 53. The keychain telecommunication components 57 of the keychain 53 activate to connect with the account information server 45, or another server to send information instructing deactivation of the one or more accounts associated with the one or more bank cards 13. The keychain telecommunication components 57 can be any telecommunication components discussed herein (cell phone, wi-fi, Bluetooth) sufficient to communicate with an outside server.

In operation, a user, being aware of a loss or theft of the device 11, may press the button 55. The keychain telecommunication components 57 activate and send information to the server 45. The server 45, in return notifies the bank or credit card company to deactivate the account. In absence of the server 45 directly notifying the bank or credit card company, the server 45 will make some output, such as a screen display or printout and a person can manually contact the bank or credit card company. Alternately, the server 45 may control activation or deactivation of the account associated with the card 13.

My invention also includes a method of storing and accessing one or more bank cards 13 for use. The method includes providing a personal bank card storage device (for example 11) for carrying one or more bank cards 13, the personal bank card storage device 11 having a container 57 capable of limiting access to the one or more bank cards 13. As discussed herein one example of a container 57 is the magazine 19 embodiment discussed herein. For example, the container 57 may comprise of an electronically lockable and unlockable door having an electronically actuated latch which controls the opening and closing of the door of the container 57. Another step of use/operation includes inserting one or more bank cards 13 in the container 57, which limits access to the one or more bank cards 13 contained therein. The method further includes programming a personal pass code (such as an alphanumeric pin) on a keypad 33 to enable the device 11 to allow access to the one or more bank cards 13 located within the container 57. At some point, a user recalls the personal pass code and then enters the personal pass code on the keypad 33 to enable access to the one or more bank cards 13 in the container 57. As discussed herein the electronic control circuitry coupled with the controller 35 for empowering means, for example, handles this function. However, other methods can be employed such as the use of alternately designed circuits to achieve the same result. Once the personal pass code is entered on the keypad 33 and the device 11 enables access to the one or more bank cards 13 in the container 57, the user then accesses the one or more bank cards 13 for use for example with a card swipe device in making a transaction.

The embodiments discussed herein are not intended to be limiting, and the inventive articles and methods disclosed herein are not intended to be exhausted or to limit the invention to the precise form discussed herein. While specific embodiments of, and example for, the invention are describe herein for illustrative purposes, various equivalent modifications are possible within the scope of the invention, as those skilled in the relevant art will recognize.

The invention claimed is:

1. A personal bank card storage device for carrying one or more bank cards, comprising:
    a housing for containing the one or more bank cards and for containing one or more components,
    a magazine contained within the housing and defined by at least one opening in said housing and having at least one set of opposing tracks for receiving an edge of said one or more bank card, at least one motor contained within the housing, the at least one motor having a shaft, and a wheel attached to the shaft, the wheel for contacting the one or more bank card while the edge of the bank card is inserted into the at least one set of opposing tracks, the wheel attached to the at least one motor via the shaft and so disposed to slide the one or more bank card along the set of opposing guide rails when the at least one motor is activated, a keypad contained within and extending through the housing for allowing a user to input information into the bank card storage device, a controller operatively connected to the keypad and the at least one motor for reading input from the keypad and operating the at least one motor, and powering means operatively connected to the controller, the keypad and the at least one motor to enable the same to operate as desired, wherein the one or more bank cards are stored for use by inserting the one or more bank card into the opening, the at least one set of opposing tracks receives the edge of said one or more bank card and the one or more bank card is engaged by the wheel attached to the at least one motor by the shaft and the at least one motor turns the wheel to take the one or more bank card into the magazine; when a one or more bank card is needed, the user inputs a code on the keypad to actuate the at least one motor to slide the one or more bank card outside of the opening of the housing.

2. The device of claim 1, further comprising:

a display operatively coupled with the controller and contained within and extending through the housing for providing the user with a visual display of information, and telecommunication components operatively coupled with the controller for connecting and communicating with an outside server over a telecommunications network, wherein the telecommunication components communicate with the outside server via the telecommunications network to obtain information relating to any accounts that are associated with the one or more bank cards, and the information is stored in a memory location and displayed on the display in accordance with an input command to display from the keypad.

3. The device of claim 2, further comprising location components operatively coupled with the controller for determining a geographic location of the bank card storage device, wherein the bank card storage device acquires its location using the location components, and, if directed to do so by user input or instructions, the controller and/or the location components communicate said location to another device utilizing the telecommunication components.

4. A personal bank card security and account tracking system for securely carrying one or more bank cards and for providing information regarding any accounts that are associated with the one or more bank cards, comprising:

an account information server, a key chain, the key chain having at least one button operatively connected to key chain telecommunication components for connecting using the communications network and relaying information to the account information server, or another server, whereby the user can notify the account information server, or another server, that personal bank card carrying device is lost or stolen by pushing the at least one button on the key chain, the telecommunication components activate to connect with the account information server, or the another server, to send information instructing deactivation of the one or more accounts associated with the one or more bank cards, a personal bank card carrying device, the personal bank card carrying device for limiting access to the one or more bank cards including:

a container having an outer surface and an inner surface, the container for holding one or more bank cards in one place, a keypad contained within and extending through the container for allowing a user to input information into the device, a controller operatively connected to the keypad for reading input from the keypad and operating one or more other components by outputting data, a display connected to the controller and contained within and extending through the container for providing the user with a visual display of information, telecommunication components operatively coupled with the controller for connecting with a communications network, powering means operatively connected to the controller, the keypad, the display, and the telecommunication components, to enable the same to operate as desired, wherein communication is initiated between the account information server and the personal bank card carrying device through the telecommunication components operatively coupled with the controller, the account information server sends the information regarding one or more accounts associated with the one or more bank cards, and said information is stored in a memory location and displayed on the display in accordance with an input command to display from the keypad, location components operatively coupled with the controller and/or the telecommunication components for determining a geographic location of the personal bank card carrying device, wherein, upon input on the keypad or automatically, the geographic location of the personal bank carrying device is acquired by location components and said geographic location is conveyed to the account information server, or another server.

5. A method of storing and accessing one or more bank cards for use, the method comprising:

providing a personal bank card storage device for carrying one or more bank cards, the personal bank card storage device having a container capable of limiting access to the one or more bank cards, inserting one or more bank cards in the container, which limits access to the one or more bank cards contained therein, programming a personal pass code on a keypad to enable the device to operate to allow access to the one or more bank cards located within the container, operating a motor to cause a wheel to contact the one or more bank cards and place the one or more bank cards entirely within the container, recalling the personal pass code, operating a motor to cause a wheel to contact the one or more bank cards and expose a portion of the one or more bank cards, and entering the personal pass code on the keypad to enable access to the one or more bank cards in the container, wherein a user accesses the one or more bank cards for use.

* * * * *